Feb. 11, 1930.　　　D. W. DUELLMAN　　　1,747,058
CULTIVATOR ATTACHMENT
Filed March 11, 1929　　　2 Sheets-Sheet 1
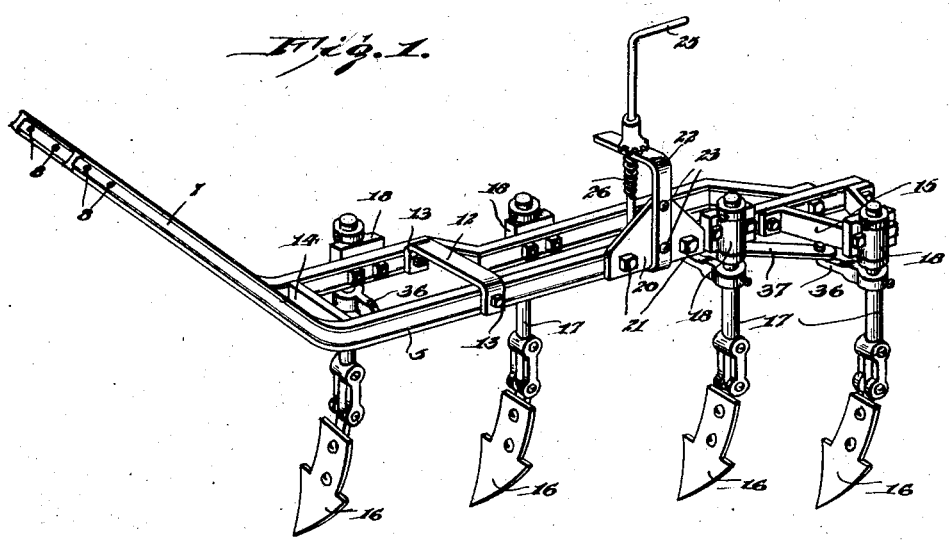
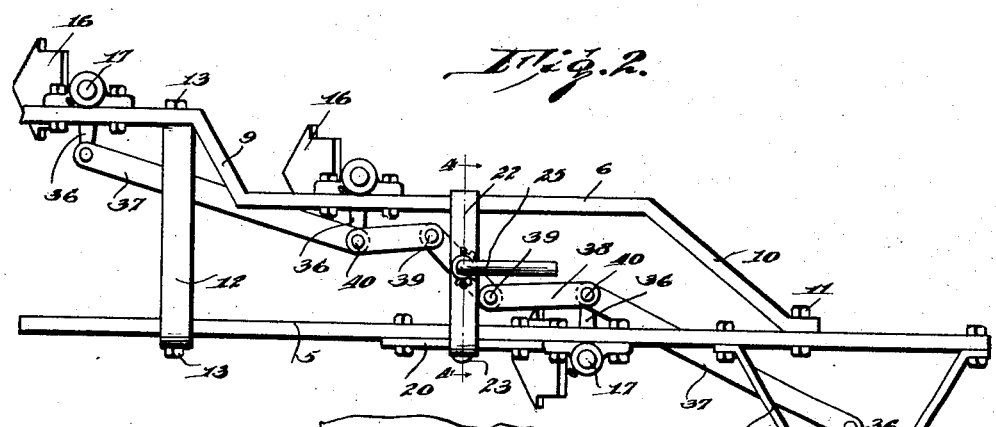
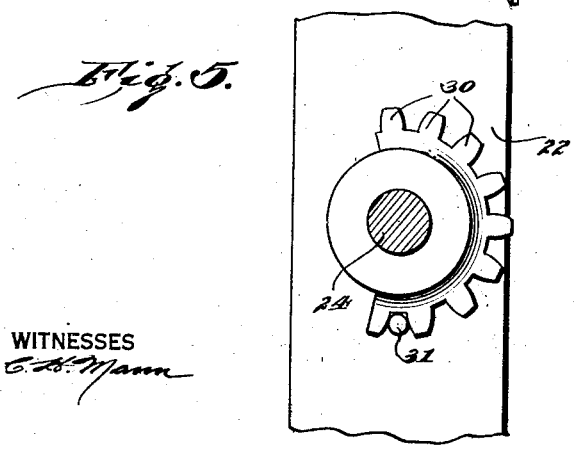
WITNESSES
INVENTOR
Daniel W. Duellman,
BY
ATTORNEY Feb. 11, 1930.     D. W. DUELLMAN     1,747,058
CULTIVATOR ATTACHMENT
Filed March 11, 1929     2 Sheets-Sheet 2
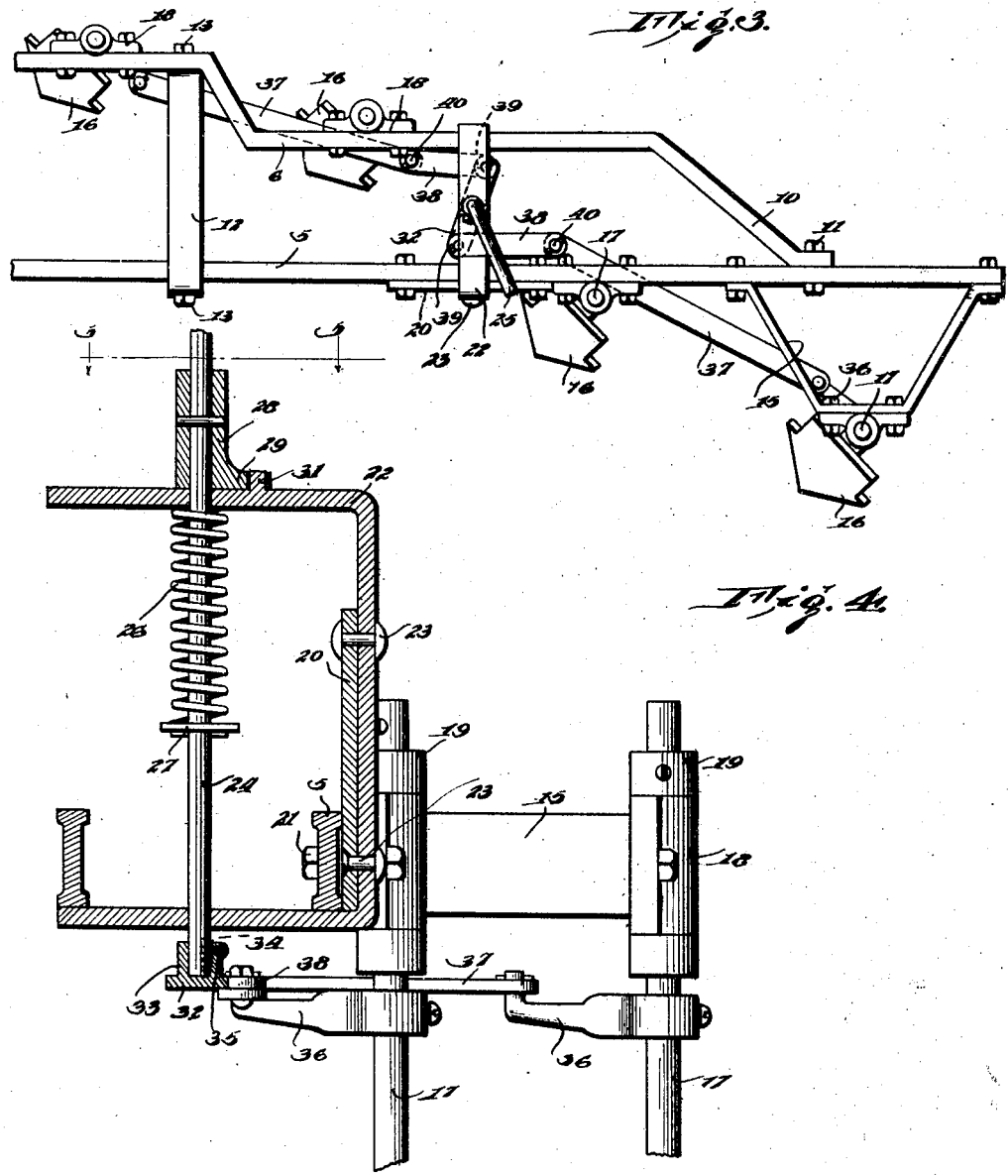
WITNESSES
INVENTOR
Daniel W. Duellman,
BY
ATTORNEY Patented Feb. 11, 1930

1,747,058

UNITED STATES PATENT OFFICE

DANIEL W. DUELLMAN, OF FOUNTAIN CITY, WISCONSIN

CULTIVATOR ATTACHMENT

Application filed March 11, 1929. Serial No. 346,166.

My invention relates to cultivators and more particularly to a cultivator attachment having a plurality of shovels or earth working elements.

An object of the present invention is to provide a cultivator attachment wherein the cultivator shovels or earth working elements may be adjusted to various angles with respect to the path of travel of the cultivator.

Further the invention provides an attachment of this character embodying a plurality of revolubly supported cultivator shovels and a common mechanism whereby the shovels may be simultaneously adjusted about their axes.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a perspective of the attachment;

Fig. 2 is a top plan view of the same illustrating the cultivator shovels adjusted to lie in longitudinal alignment with the path of travel of the cultivator;

Fig. 3 is a similar view and illustrating the cultivator at an angle with relation to the path of travel of the cultivator;

Fig. 4 is an enlarged vertical sectional view taken on line 4—4 of Fig. 2; and

Fig. 5 is a horizontal section taken on line 5—5 of Fig. 4.

Referring to the invention in detail a frame is provided which consists of a pair of I-beams 5 and 6 arranged horizontally and substantially parallel. At their forward ends the I-beams are extended upwardly at an angle to constitute attaching arms 7 to be attached to part of a cultivator frame. Registering openings 8 are provided in the upper ends of the arms for the reception of bolts or other fastenings to secure the attachment to the cultivator.

At a point intermediate its ends the I-beam 6 is formed with an angularly disposed portion 9 while its rear end terminates in an angular extension 10 which is secured to the I-beams 5 adjacent its rear end by a suitable fastening 11. An inverted U-shaped member 12 extends transversely of the I-beams at a point slightly in advance of the angularly disposed portion 9 and has its terminals secured to the I-beams by fastenings 13. Also a suitable brace 14 is interposed between the I-beams at a point slightly in advance of the arms 7. Attached to the rear end of the I-beam 5 and projecting laterally and horizontally therefrom is a substantially U-shaped bracket 15.

A plurality of cultivator shovels or earth working elements 16 are supported from the frame and are arranged in stepped relation with respect to the longitudinal axis of the frame. Each of the cultivator shovels is carried by a cylindrical vertically extending shank whose upper ends are revolubly mounted in vertically disposed bearings 18 attached to the I-beams and bracket 15, respectively.

Stop collars 19 are detachably held on the upper ends of the shanks 17 to removably hold the same in the bearings.

For the purpose of simultaneously rotating the shanks 17 to adjust the cultivator shovels in parallelism to lie at various angles with respect to the line of draft of a cultivator an adjusting mechanism is provided. The adjusting mechanism comprises a vertically disposed plate 20 which is secured to the outer face of the I-beam 5 adjacent its rear end by fastenings 21. A U-shaped bracket 22 is arranged with its parallel legs extending transversely of the frame and its intermediate leg extending vertically along the outer face of the plate and riveted or otherwise secured thereto as at 22. As particularly illustrated in Fig. 4 the parallel legs of the U-shaped bracket are positioned with the lower leg abutting the under face of the I-beams while the upper leg is located at a considerable height above the I-beams.

A revoluble and vertically movable rod 24 passes centrally through the horizontal legs of the bracket and has its extremities projecting beyond these parts. At its upper end the rod is formed with a horizontally extending actuating handle 25. To normally urge the rod in a downward direction a coil spring 25 encircles the rod. The lower end of the coil spring bears against a washer 27 fixed to the rod while its upper end abuts the upper horizontal leg of the bracket.

To maintain the rod in selected adjusted positions about its axis a sleeve 28 is secured on the rod at a point above the bracket and is formed with a semi-circular flange 29 which normally abuts the upper face of the upper horizontal leg of the bracket and is formed with radially disposed spaced teeth 30 along its outer edge. An upstanding lug 31 projects from the upper face of this leg of the bracket and is located in the path of movement of the teeth and is normally engaged between two adjacent teeth. It will be observed that upon lifting the rod against the tension of the spring 26 the teeth will clear the lug so that the rod may be rotated to the desired position and that upon release of the rod the spring will function to urge the latter downwardly to engage the teeth with the lug.

A toggle link 32 is arranged horizontally below the lower end of the rod and is formed with an upstanding collar 33 at its center and which receives the lower end of the rod. A key way 34 extends longitudinally of the lower end of the rod and receives a key or set screw 35 passing transversely through the collar at one side thereof. A horizontally disposed laterally extending arm 36 is fixed to each of the shanks 17 at a point in horizontal alignment with the toggle link and pivotally connected with each two adjacent arms is a relatively long link 37. Links 38 are pivotally connected with toggle links as 39 and have their opposite ends pivotally connected with the adjacent arms 36 as at 40. It will therefore be observed that the cultivator shovels may be simultaneously adjusted to various angles by manipulation of the rod 24. In this connection it is pointed out that the attachment is particularly adapted for side hill cultivation due to the shovels being adjustable to lie parallel to the rows of plants.

What is claimed is:

1. In a cultivator a frame, a plurality of rotatably mounted cultivator shovels carried thereby, a plurality of links operatively connected together and having operative connection with the cultivator shovels for adjusting the same simultaneously in parallelism, a U-shaped bracket attached to the frame and having its parallel legs extending horizontally, a rod revolubly and slidably mounted in the horizontal legs and having its lower end operatively connected with one of the links, a spring normally urging the rod in a downward direction, coacting latch members carried by the bracket and rod, respectively for latching the rod in selected positions about its axis, the latch elements being disengaged to permit rotation of the rod upon raising the latter against the action of the spring.

2. In a cultivator attachment a frame, a plurality of cultivator shovels carried thereby and mounted for adjustment about vertical axes, horizontally arranged links operatively connected together and having operative connection with the shovels, a bracket supported by the frame, an actuating rod revolubly and slidably supported by the brackets and having its lower end operatively connected with one of the links, a segmental toothed latch member fixed to the rod, an upstanding lug on the bracket and normally engaged by the latch member, a spring engaged with the rod and normally urging it downwardly, the rod being adapted to be lifted against the action of the spring to disengage the latch member from the lug prior to rotation of the handle to move the links.

DANIEL W. DUELLMAN.